(12) United States Patent
Cymbal et al.

(10) Patent No.: US 7,882,761 B2
(45) Date of Patent: Feb. 8, 2011

(54) ADJUSTABLE STEERING COLUMN ASSEMBLY WITH COMPRESSIVE LOCKING MECHANISM

(75) Inventors: William D. Cymbal, Freeland, MI (US); Donald A. Niedzielski, Bay City, MI (US); Douglas P. Wendling, Chesaning, MI (US); Roger A. Bourbina, Saginaw, MI (US)

(73) Assignee: Nexteer (Beijing) Technology Co., Ltd.

( * ) Notice: Subject to any disclaimer, the term of this patent is extended or adjusted under 35 U.S.C. 154(b) by 439 days.

(21) Appl. No.: 12/006,760

(22) Filed: Jan. 5, 2008

(65) Prior Publication Data

US 2009/0173179 A1 Jul. 9, 2009

(51) Int. Cl.
*B62D 1/18* (2006.01)

(52) U.S. Cl. .......................................... 74/493; 280/775

(58) Field of Classification Search ................... 74/493; 280/775

See application file for complete search history.

(56) References Cited

U.S. PATENT DOCUMENTS

| | | |
|---|---|---|
| 4,041,796 A | 8/1977 | Shishido |
| 4,788,880 A | 12/1988 | Kester |
| 4,915,412 A | 4/1990 | Yuzuriha et al. |
| 5,117,707 A | 6/1992 | Kinoshita et al. |
| 5,131,287 A | 7/1992 | Stromberg |
| 5,165,720 A | 11/1992 | Hoblingre |
| 5,199,319 A | 4/1993 | Fujiu |
| 5,239,889 A | 8/1993 | Hancock |
| 5,306,032 A | 4/1994 | Hoblingre et al. |
| 5,377,555 A | 1/1995 | Hancock |
| 5,409,261 A | 4/1995 | Yamaguchi |
| 5,527,068 A | 6/1996 | Schneider |
| 5,570,610 A | 11/1996 | Cymbal |
| 5,657,668 A | 8/1997 | Hibino et al. |
| 5,704,641 A | 1/1998 | Shimizu et al. |
| 5,730,465 A | 3/1998 | Barton et al. |
| 5,743,150 A | 4/1998 | Fevre et al. |
| 5,761,966 A | 6/1998 | Cuiller et al. |
| 6,092,957 A | 7/2000 | Fevre et al. |
| 6,450,531 B1 | 9/2002 | Rinker et al. |
| 6,467,807 B2 | 10/2002 | Ikeda et al. |
| 6,616,185 B2 | 9/2003 | Manwaring et al. |
| 6,659,504 B2 | 12/2003 | Riefe et al. |
| 6,824,166 B2 | 11/2004 | Peel |
| 6,981,430 B2 | 1/2006 | Murakami et al. |
| 2002/0178857 A1* | 12/2002 | Matsumiya .................. 74/493 |

(Continued)

OTHER PUBLICATIONS

US 6,880,423, 04/2005, Murakami et al. (withdrawn)

*Primary Examiner*—Thomas R Hannon
*Assistant Examiner*—Justin Krause
(74) *Attorney, Agent, or Firm*—Cantor Colburn LLP (57) ABSTRACT

An adjustable steering column assembly with a steering shaft extending through a jacket member. An elongate locking member extends through two opposed sidewalls and a compression member positioned between the sidewalls. One of either the sidewalls or the compression member is fixed relative to the jacket member while the other is fixed relative to the vehicle structure. Spacers are located on opposite sides of the compression member between the compression member and the two sidewalls. First and second abutment surfaces are engaged with outward facing surfaces of the sidewalls and are coupled to the elongate locking member. An actuator assembly moves the locking assembly between unlocked and locked positions. In the locked position, the abutment surfaces bias the sidewalls inwardly to firmly engage the compression member between the spacers.

21 Claims, 4 Drawing Sheets

U.S. PATENT DOCUMENTS

2003/0000330 A1* 1/2003 Murakami et al. ............ 74/492
2004/0113408 A1* 6/2004 Yamamoto et al. .......... 280/775
2005/0160863 A1* 7/2005 Matsumiya .................. 74/492
2005/0242560 A1* 11/2005 Inoue ......................... 280/775

* cited by examiner

Fig. 1 (PriorArt)

Fig. 2 (PriorArt)

ADJUSTABLE STEERING COLUMN ASSEMBLY WITH COMPRESSIVE LOCKING MECHANISM

BACKGROUND OF THE INVENTION

1. Field of the Invention

The present invention relates to steering column assemblies and, more particularly, to steering column assemblies that may be repositioned by the vehicle operator.

2. Description of the Related Art

Steering columns for automobiles and other vehicles that can have the tilt or rake angle of the column and the axial length of the column adjusted by the vehicle operator are well known in the art. A wide variety of such axially and tiltably adjustable steering columns have been developed. An example of one such steering column is shown in FIGS. 1 and 2.

Figure 1:
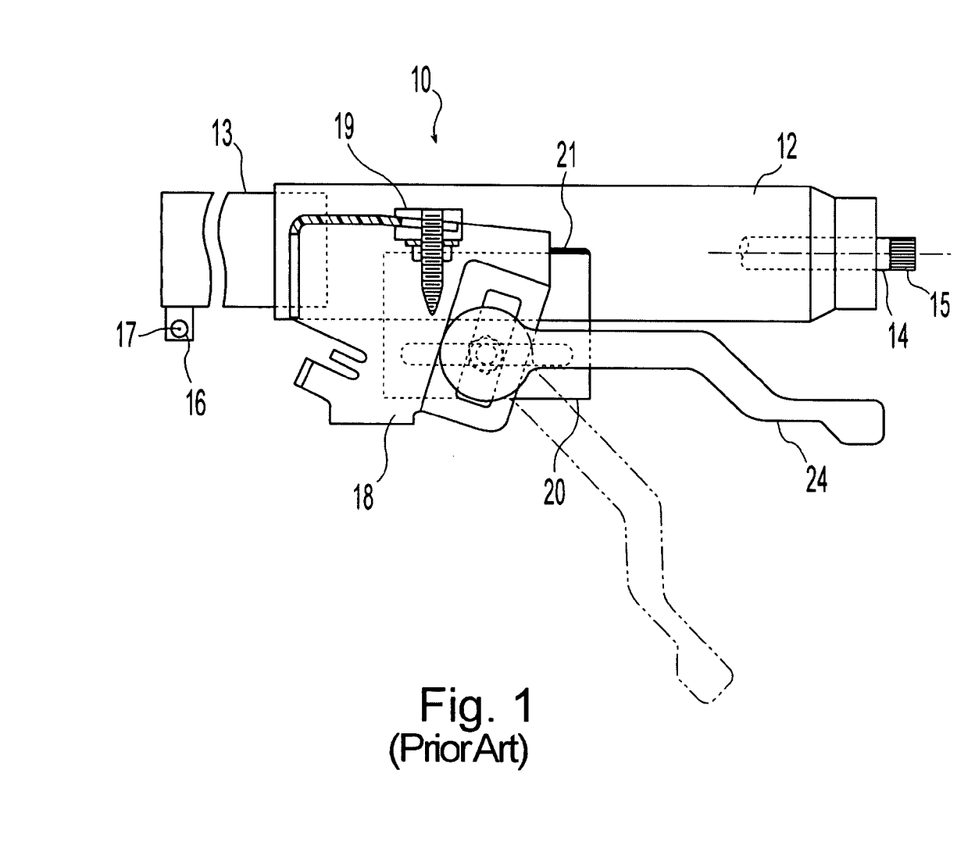
FIG. 1 is a side view of a prior art adjustable steering column assembly.
Figure 2:
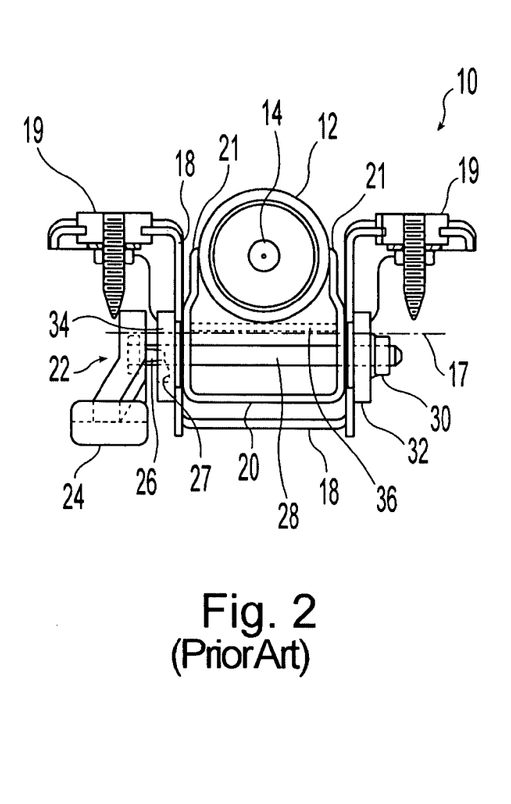
FIG. 2 is a front view of the prior art steering column assembly of FIG. 1.

In the prior art steering column assembly depicted in FIGS. 1 and 2, the adjustable steering column assembly 10 includes an upper tubular steering jacket 12 and a lower jacket 13. Upper and lower jackets 12, 13 are telescopingly coupled so that the axial length of the column can be adjusted. A steering shaft 14 extends through the hollow interior of the steering jackets 12, 13. The steering shaft 14 has a steering wheel (not shown) mounted on its projecting end 15 and rotates within steering jackets 12, 13. Steering shaft 14 and steering jackets 12, 13 are adjustably tiltable about pivot member 16 which defines tilt axis 17.

A mounting bracket 18 is formed out of stamped sheet metal and is attached to the vehicle structure with fastener assemblies 19. A compression bracket 20 is also formed out of stamped sheet metal and is attached to upper jacket 12 with welds 21 along opposite sides of jacket 12. Compression bracket 20 fits closely within mounting bracket 18. When steering jackets 12, 13 and steering shaft 14 are tilted about axis 17, mounting bracket 18 remains stationary while compression bracket 20 moves with upper steering jacket 12 within mounting bracket 18. The compression bracket 20 is also displaced relative to mounting bracket 18 when the upper jacket 12 is axially repositioned relative to lower jacket 13 to adjust the overall axial length of the steering column assembly 10.

A locking assembly 22 is provided to secure and release compression bracket 20 relative to mounting bracket 18 to thereby secure steering column 10 in a desired tilt angle at a desired axial length and release steering column 10 for adjustment of the tilt angle and/or axial length.

Locking assembly 22 includes a manually operated lever arm 24. Movement of lever arm 24 between a first position, shown in solid lines in FIG. 1, close to upper jacket member 12 and a second position, shown in dashed lines in FIG. 1, extending outwardly relative to upper jacket 12, operably engages camming member 26. Bolt 28 extends through openings in the sidewalls of mounting bracket 18 and compression bracket 20 and has a nut 30 attached at one end.

Abutment members 32, 34 are located on opposite sides mounting bracket 18 and are coupled with bolt 28 such that as lever 24 is moved from its second position to its first position (shown in solid lines in FIG. 1), camming member 26 moves along camming ramp 27 and biases abutment members 32, 34 closer together to thereby cause abutment members 32, 34 to compress the sidewalls of mounting bracket 18 to firmly engage the sidewalls of compression bracket 20 and thereby secure steering jackets 12, 13 and steering shaft 14 in a desired position. Movement of lever arm to its second position (shown in dashed lines in FIG. 1) increases the distance between abutment members 32, 34 sufficiently to allow compression bracket 20 to move within mounting bracket 20 to allow the operator of the vehicle to reposition compression bracket 20 relative to mounting bracket 18 and thereby adjust the tilt angle and/or axial length of steering column assembly 10. After the operator has repositioned the steering column, the operator will return lever 12 into its first position and thereby secure the steering column at the desired position.

While the adjustable steering column assembly 10 described above performs adequately, the forces applied to the sidewalls of the mounting bracket 18 to inwardly compress the mounting bracket sidewalls also act on the sidewalls of the compression bracket 20 which are formed out of stamped metal sheet stock in the same manner as the sidewalls of the mounting bracket. To increase the resistance of the compression bracket sidewalls to inward compression and thereby provide a more firm engagement between the mounting bracket 18 and the compression bracket 20 when the assembly is in a locked condition, an optional stiffening plate 36 can be welded to the compression bracket 20 as shown in FIG. 2. While the use of such a stiffening plate 36 enhances the resistance of the compression bracket sidewalls to inward compression and thereby improves the performance of the assembly, it also increases the manufacturing complexity of the assembly while still leaving room for further improvement.

SUMMARY OF THE INVENTION

The present invention provides an adjustable steering column assembly wherein when the assembly is placed in a locked condition, inward compressive forces exerted by the sidewalls of a mounting bracket are transferred to a compression member by spacers which firmly engage the compression member to thereby hold the steering column in place.

The invention comprises, in one form thereof, an adjustable steering column assembly securable to a support structure within a vehicle and having a steering shaft. The steering column assembly includes a jacket member defining a jacket axis wherein the steering shaft extends through the jacket member. The jacket member and the steering shaft are adjustably pivotal together about a tilt axis wherein pivotal movement of the jacket axis defines a central plane positioned substantially perpendicular to the tilt axis. A compression member is provided and has an opening extending through the compression member in a direction substantially transverse to the central plane. First and second opposing sidewalls are positioned on opposite sides of the compression member wherein one of the compression member and the first and second opposing sidewalls is fixed relative to the vehicle structure and the other of the compression member and the first and second opposing sidewalls is fixed relative to the jacket member. The first and second sidewalls each have an inward facing surface and an outward facing surface and respectively define first and second passages extending between the inward and outward facing surfaces. The steering column assembly also includes first and second spacers. Each of the first and second spacers defines a channel extending therethrough. An elongate locking member extends through the first and second passages, the channels defined by the first and second spacers and the opening defined by the compression member wherein the first and second spacers are located on opposite sides of the compression member between the compression member and a respective one of the first and second opposing sidewalls. The steering column assembly also includes first and second abutment surfaces. The first abutment surface is engageable with the outwardly facing surface of the first sidewall and the second abutment surface is engageable with the outwardly facing surface of the second sidewall. The elongate locking member is operably coupled with the first and second abutment surfaces wherein forces biasing the first and second abutment surfaces apart place the elongate locking member in tension. An actuator assembly is operably coupled with the abutment surfaces wherein movement of the actuator assembly moves the steering column assembly between an unlocked position wherein the first and second abutment surfaces define a first distance therebetween, and a locked position wherein the first and second abutment surfaces define a second distance therebetween wherein the first distance is greater than the second distance. In the locked position, the first and second abutment surfaces exert a compressive force on the first and second opposing sidewalls whereby the first and second sidewalls deflect inwardly and compressively secure the compression member between the first and second spacers and thereby inhibit relative movement of the compressive member and the first and second sidewalls. In the unlocked position, the compressive force exerted by the first and second abutment surfaces is reduced to thereby permit relative movement of the compressive member and the first and second sidewalls. A combined length of the first and second spacers between the first and second abutment surfaces defines a third length wherein the third length is at least an approximate majority of the second distance between the abutment surfaces.

The invention comprises, in another form thereof, an adjustable steering column assembly securable to a support structure within a vehicle and having a steering shaft. The adjustable steering column assembly includes a jacket member defining a jacket axis. The steering shaft extends through the jacket member and the steering shaft and jacket member are adjustably pivotal together about a tilt axis wherein the tilt axis extends substantially perpendicular to the jacket axis. A compression member is secured to the jacket member wherein the compression member defines a first thickness in a direction substantially transverse to the jacket axis. The compression member further defines an opening extending through the compression member in direction substantially transverse to the jacket axis. A bracket having a substantially U-shaped portion with first and second opposing sidewalls and an interconnecting portion extending between said first and second sidewalls is provided. The bracket member is adapted for non-moveable securement to the support structure within the vehicle. The jacket member is operably coupled with the bracket member wherein the tilt axis extends substantially transversely relative to the first and second opposing sidewalls and the jacket member is selectively pivotal relative to the bracket member within the U-shaped portion of the bracket member. The first and second sidewalls each have an inward facing surface and an outward facing surface and respectively define first and second passages extending between said inward and outward facing surfaces. First and second spacers are provided and each of the first and second spacers define a channel extending therethrough. An elongate locking member extends through the first and second passages, the channels defined by the first and second spacers and the opening defined by the compression member wherein the first and second spacers are located on opposite sides of the compression member between the compression member and a respective one of the first and second opposing sidewalls. The elongate locking member is repositioned relative to at least one of the jacket member and the bracket member as the jacket member is pivoted relative to the bracket member. First and second abutment surfaces are also provided. The first abutment surface is engageable with the outwardly facing surface of the first sidewall and the second abutment surface is engageable with the outwardly facing surface of the second sidewall. The elongate locking member is operably coupled with the first and second abutment surfaces wherein forces biasing the first and second abutment surfaces apart place the elongate locking member in tension. An actuator assembly is operably coupled with the first and second abutment surfaces wherein movement of the actuator assembly moves the locking assembly between an unlocked position wherein the first and second abutment surfaces define a first distance therebetween, and a locked position wherein the first and second abutment surfaces define a second distance therebetween and wherein the first distance is greater than the second distance. In the locked position, the first and second abutment surfaces exert a compressive force on the first and second opposing sidewalls whereby the first and second sidewalls deflect inwardly and compressively secure the compression member between the first and second spacers and thereby inhibit relative movement of the compressive member and the bracket member. In the unlocked position, the compressive force exerted by the first and second abutment surfaces is reduced to thereby permit relative movement of the compressive member and the bracket member.

An advantage of the present invention is that it facilitates the efficient manufacture of an adjustable steering column assembly and allows the vehicle operator to firmly secure the steering column in a desired position.

BRIEF DESCRIPTION OF THE DRAWINGS

The above mentioned and other features of this invention, and the manner of attaining them, will become more apparent and the invention itself will be better understood by reference to the following description of the invention taken in conjunction with the accompanying drawings, wherein.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION OF THE INVENTION

Figures 3, 4, 5, 6:
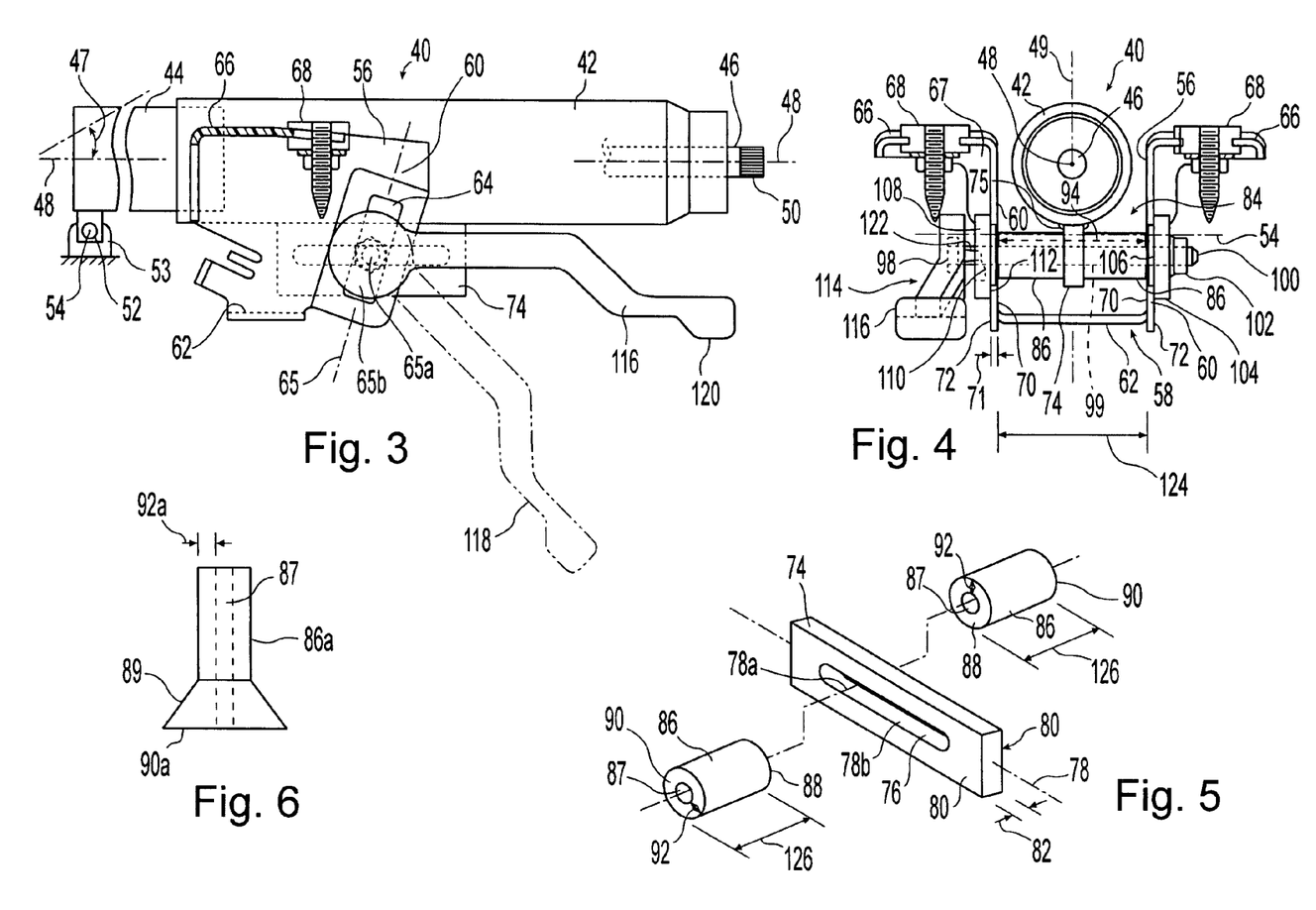
FIG. 3 is a side view of an adjustable steering column assembly in accordance with the present invention.
FIG. 4 is a front view of the steering column assembly of FIG. 3 with some parts shown in cross-section view.
FIG. 5 is an exploded perspective view of a portion of the steering column assembly of FIG. 3.
FIG. 6 is a side view of an alternative spacer.

An adjustable steering column assembly 40 in accordance with the present invention is illustrated in FIGS. 3 and 4. Steering column assembly 40 includes an upper elongate jacket member 42 and a lower elongate jacket member 44. The upper and lower jacket members 42, 44 are telescopingly coupled together so that the axial length of steering column assembly 40 can be adjusted. The use of telescoping jacket members to form a steering column having an adjustable axial length is well-known in the art.

Steering shaft 46 extends through jacket members 42, 44 along jacket axis 48. Steering shaft 46 is rotatable within jackets 42, 44 and has a steering wheel (not shown) mounted on its projecting end 50 while the opposite end of shaft 46 is coupled to the steered wheels of the vehicle. Jacket members 42, 44 are pivotally mounted on pivot member 52. The position of pivot member 52 is fixed relative to the vehicle structure and defines tilt axis 54. Vehicle structure 53 to which steering column 40 is pivotally mounted is symbolically represented in FIG. 3. Steering shaft 46 is pivotal relative to the vehicle structure about tilt axis 54 together with jacket members 42, 44. When the axial length of column assembly 40 is adjusted, lower jacket member 44 remains fixed relative to the vehicle structure while upper jacket 42 and projecting end 50 of shaft 46 are axially repositioned relative to lower jacket 44 and the vehicle structure. The ability to pivot steering column assembly 40 about tilt axis 54 and adjust its axial length allows the operator of the vehicle to reposition the steering wheel of the vehicle. When column assembly 40 is adjustably tilted, jacket axis 48 moves through an arc 47 (FIG. 3) and defines a central plane 49 (FIG. 4) of assembly 40.

Steering jacket and shaft assemblies which are pivotally mounted on a vehicle structure and have an axial length that is adjustable are well known to those having ordinary skill in the art and various other configurations of such jacket and shaft assemblies may also be used with the present invention.

Steering column assembly 40 also includes a mounting bracket 56. Mounting bracket 56 has a U-shaped portion 58 that is formed by opposing sidewalls 60 and an interconnecting portion 62. Bracket 56 also includes upper flanges 66 that extend outwardly from sidewalls 60. Upper flanges 66 include fastener assemblies 68 for securing mounting bracket 56 to the vehicle structure. Stiffening flanges 67 are located along one edge of upper flange 66 and the top portion of sidewalls 60. The securement of mounting bracket 56 to the vehicle structure with fastener assemblies 68 non-moveably secures, i.e., fixes, mounting bracket 56 relative to the vehicle structure. Thus, as upper jacket member 42 and steering shaft 46 are pivoted about tilt axis 54 they move relative to bracket 56 within U-shaped portion 58.

Each of the sidewalls 60 has an inward facing surface 70 and an outward facing surface 72. Sidewalls 60 also each include a passage 64 that extends through the sidewall from outer surface 72 to inner surface 70. Passages 64 allow elongate locking members 96 to be inserted through passages 64 at a substantially transverse angle to central plane 49. Passages 64 take the form of slots that are elongate in a direction 65 positioned at an angle to jacket axis 48 as can be seen in FIG. 3. The elongate nature of passages 64 allow elongate locking member 96 to be repositioned within passages 64 as steering jackets 42, 44 and steering shaft 46 are pivoted about tilt axis 54. For example, locking member 96 is shown in position 65a in FIGS. 3 and 4 but could be repositioned in position 65b by the downward tilting of jackets 42, 44 about axis 54. Arc 47 also shown in FIG. 3 is representative of upward tilting of the column assembly.

In the illustrated embodiment, the elongate slots formed by passages 64 are substantially rectilinear and have a width that is sufficiently large to accommodate the lateral movement within the slot of locking member 96. If desired, however, an elongate and arcuate slot that extends at an angle to jacket axis 48 and tracks the arcuate path of locking member 96 could be used.

In the illustrated embodiment, mounting brackets 56 are formed by stamping a steel sheet stock material. As discussed below, sidewalls 60 are resilient and are deflected slightly inwardly when locking steering column assembly 40 in a desired position. The use of a steel sheet material having a thickness of between approximately 3 mm and 3.5 mm provides sidewalls 60 with the ability to be resiliently deflected inwardly for such locking purposes while also providing bracket 56 with suitable strength. In the illustrated embodiment, sidewalls 60 have a thickness 71 of approximately 3.42 mm. Other embodiments of the present invention, however, may use sidewalls and/or mounting brackets formed out of other materials and/or other dimensions.

A compression member 74 is attached to upper jacket member 42 and has an opening 76 that extends through compression member 74 in a direction substantially transverse to central plane 49 with locking member 96 passing therethrough. Opening 76 takes the form of an axially elongate slot to thereby allow locking member 96 to be repositioned within opening 76 when upper jacket member 42 is axially repositioned relative to the vehicle structure. As discussed above, the position of mounting bracket 56 is fixed relative to the vehicle structure. Elongate locking member 96 is moveable relative to mounting bracket 56 but this relative movement is substantially constrained to movement along directional line 65 which allows for the relative tilting movement of adjustable steering column 40.

In the embodiment illustrated in FIGS. 3-5, opening 76 forms a slot that is elongated in a direction 78 that allows locking member 96 to be axially repositioned within slot 76, e.g., between position 78a and 78b (FIG. 5), as upper jacket member 42 and steering shaft 46 are axially repositioned relative to the vehicle structure. In the embodiment of FIGS. 3-5, compression member 74 is formed of metal bar stock that is secured to upper jacket member 42 with welds 75 at a 6 o'clock position with compression member 74 being centered on central plane 49 and slot directional line 78 being positioned parallel with jacket axis 48. The illustrated compression member 74 defines a thickness 82 between its opposite side surfaces 80 that is between approximately 8 mm and 10 mm. For example, the illustrated compression member 74 may be formed out of a low carbon steel having a thickness of 8 mm.

Two spacers 86 are located on opposite sides of compression member 76. In the embodiment of FIGS. 3-5, spacers 86 have a cylindrical shape with cylindrical channels 87 extending therethrough for allowing passage of elongate locking member 96. Spacers 86 have inward facing end surface 88 that engage opposite side surfaces 80 of compression member 74 and outward facing ends surfaces 90 that engage inward facing surfaces 70 of sidewalls 60. As further discussed below, when sidewalls 60 are deflected inwardly to lock steering column 40 in a desired position, sidewalls 60 compress spacers 86 into engagement with both side surfaces 80 of compression member 74 and inward facing surfaces 70 of sidewalls 60. This compressive engagement of spacer surfaces 90 with sidewall surfaces 70 and spacer surfaces 88 with compressive member surfaces 80 frictionally resists relative movement at these surface engagements to secure compressive member 74 relative to mounting bracket 56. Compressive member 74 is attached to upper jacket 42 while mounting bracket 56 is attached to the vehicle structure, thus, the compressive engagement of these surfaces secures upper jacket member 42, and steering shaft 46 mounted therein, in a selected position relative to the vehicle structure.

The use of spacers 86 and compressive member 74 provides a robust locking mechanism by providing a substantially void-free solid material bridge through which at least some of the inwardly directed compressive forces exerted by sidewalls 60 can be linearly transmitted between opposing sidewalls 60, see, e.g., force line 94 in FIG. 4. This arrangement allows for relatively high compressive forces to be generated in the locking action to thereby firmly secure steering column assembly 40 in a desired configuration. Spacers 86 have a wall thickness (in a direction transverse to the compressive forces transmitted by spacers 86) that is sufficiently great to withstand the compressive loads placed thereon. In the illustrated embodiment, spacers 86 are formed of metal material, e.g., steel, and have a wall thickness 92 (FIG. 5) which extends substantially transverse to the linearly transmitted compressive forces 94 and which is approximately 6 mm.

Biasing sidewalls 60 inwardly reduces the distance 124 between inward facing surfaces 70 of sidewalls 60. As best understood with reference to FIGS. 4 and 5, the use of a compression member 74 having a thickness of approximately 8 mm, and sidewalls 60 having a thickness 71 of between approximately 3 mm and 3.5 mm with spacers 86 that span the full distance between compression member 74 and sidewalls 60 to provide a solid material bridge between the two sidewalls results in spacers having lengths 126 which, when combined together, form greater than 50% of the total length 124 between sidewalls 60 when locking assembly 84 is in its locked condition.

Various spacer configurations and materials can be used to transmit compressive loads between opposing sidewalls 60 in other embodiments of the invention. For example, an alternative spacer 86*a* is illustrated in FIG. 6. Alternative spacer 86*a* includes a frustroconical-end 89 that defines an end surface 90*a* having a larger surface area for bearing engagement with the inward facing surface 70 of sidewalls 60. The configuration of end surface 90*a* substantially corresponds to the configuration of abutment surfaces 106 and 112 to thereby reduce stresses within sidewalls 60 created by the transmission of compression forces from abutment surfaces 106, 112 to the spacer end surfaces in engagement with the inward facing surfaces 70 of sidewalls 60. The minimum wall thickness 92*a* of this alternative spacer 86 is comparable to the wall thickness 92 of spacer 86. In still other embodiments, washers or other intermediate bearing members may be placed between sidewalls 60 and spacers 86 and/or between compressive member 74 and spacers 86. Such washers or other intermediate bearing members can be employed to provide a desired bearing surface area or frictional coefficient at the interfaces with sidewalls 60 and/or compressive member 74.

Elongate locking member 96 extends through passages 64 in both sidewalls 60, through channels 87 in both spacers 86, and through opening 76 in compression member 74 with each of the spacers 86 being located on an opposite side of compression member 74 between compression member 74 and one of sidewalls 60 as best seen in FIG. 4. In the embodiment of FIGS. 3-5, locking member 96 takes the form of a bolt with one end being formed by a hexagonal bolt head 98 and the other end being a threaded shaft 100 and an elongate shaft 99 therebetween. A threaded nut 102 is secured on threaded end 100 of bolt 96 and secures abutment member 104 against sidewall 60 with abutment surface 106 being engaged with outward facing surface 70 of sidewall 60. Another abutment member 108 is secured against the opposite sidewall 60 with abutment surface 112 being engaged with outward facing surface 70. Both abutment members 104 and 108 have central apertures through which bolt 96 extends.

A locking assembly 84 is formed by abutment surfaces 106, 108, sidewalls 60, spacers 86, compression member 74 and locking member 96 to secure compression member 74 relative to sidewalls 60. When locking assembly 84 is in an unlocked condition, abutment surfaces 106, 108 are positioned apart by a sufficiently great distance such that sidewalls 60 are not deflected inwardly or are deflected inwardly to such a small distance that compressive member 74 can slide relative to spacers 86 and locking member 96 (to provide for axial adjustment of column assembly 40) and sidewalls 60 can slide relative to spacers 86 and locking member 96 (to provide for tilting adjustment of column assembly 40).

When locking assembly is in a locked condition, abutment surfaces 106 and 112 are biased inwardly against outer surfaces 72 of sidewalls 60 to thereby deflect sidewalls 60 inwardly and compress surfaces 70 of sidewalls 60 against surfaces 90 of spacers 86 and surfaces 88 of spacers 86 against opposite side surfaces 80 of compression member 74. These compressive forces create frictional resistance to relative sliding movement between these surfaces and thereby secure compressive member 74 relative to sidewalls 60 and, thus, secure column assembly 40 in a selected axial and tilt angle position.

Washers or other intermediate bearing members, such as those discussed above with reference to the spacer interfaces, may also be used between abutment surfaces 106, 112 and outer surfaces 72 of sidewalls 60 to provide a desired bearing surface area or frictional coefficient. The illustrated abutment members 104, 108 are mounted on locking member 96 and move with locking member 96 relative to sidewalls 60 when steering jacket 42 is tilted about axis 54.

Elongate member 96 is coupled with abutment surfaces 106, 112 such that biasing abutment surfaces 106, 112 together to compress sidewalls 60 inwardly that biases surfaces 106, 112 apart) places elongate member 96 in tension. In other words, applying a force to surfaces 106, 112 that biases surfaces 106, 112 apart places elongate member 96 in tension. On threaded end 100 of member 96, nut 102 is used to couple member 96 with abutment member 104 and abutment surface 106 to provide for the transmission of such forces. A washer, e.g., a locking washer, may be positioned between nut 102 and abutment member 104. Alternatively, abutment member 104 may take the form of either a nut or washer. Forces are transmitted between abutment surface 112 and bolt head 98 through actuator assembly 114.

Actuator assembly 114 is coupled with locking assembly 84 to move the locking assembly 84 between its locked and unlocked positions. Actuator assembly 114 includes manually operable lever arm 116 which can be moved between a first position 118 (indicated by phantom lines in FIG. 3) and a second position 120 by the driver of the vehicle. Bolt head 98 is captured within lever arm 116. Actuator assembly 114 also includes a camming finger 122 located on lever arm 116 and an inclined camming surface 110 located on abutment member 108. When lever arm 116 is in position 118, locking assembly 84 is in its unlocked position with abutment surfaces 106, 112 being spaced apart by a distance that allows for relative movement of compressive member 74 and sidewalls 60. When lever arm 116 is rotated into position 120, the interaction of camming fingers 122 and inclined camming surfaces 110 (advantageously, three such fingers and surfaces are distributed circumferentially around locking member 96) biases abutment surfaces 106, 112 toward each other. Bolt head 98 is captured within lever arm 116 and thus abutment member 108 is biased away from bolt head 98 toward nut 102 by the movement of lever arm 116 into position 120.

After moving lever arm 116 into position 120, abutment surfaces 106, 112 are spaced apart by a distance lesser distance than when lever arm 116 was in position 118, thereby deflecting sidewalls 60 inwardly and placing locking assembly 84 in its locked condition. There are a variety of camming and biasing arrangements that can be used in an adjustable steering column assembly with an elongate locking member to bias a pair of sidewalls inwardly for locking and unlocking the steering column assembly. Examples of such camming and biasing arrangements that can be adapted for use with the present invention are disclosed by Riefe et al. in U.S. Pat. No. 6,659,504 B2; by Manwaring et al. in U.S. Pat. No. 6,616,185 B2; Cymbal in U.S. Pat. No. 5,570,610; and Hancock in U.S. Pat. No. 5,377,555 the disclosures of which are all hereby incorporated herein by reference.

Figures 7, 8, 9:
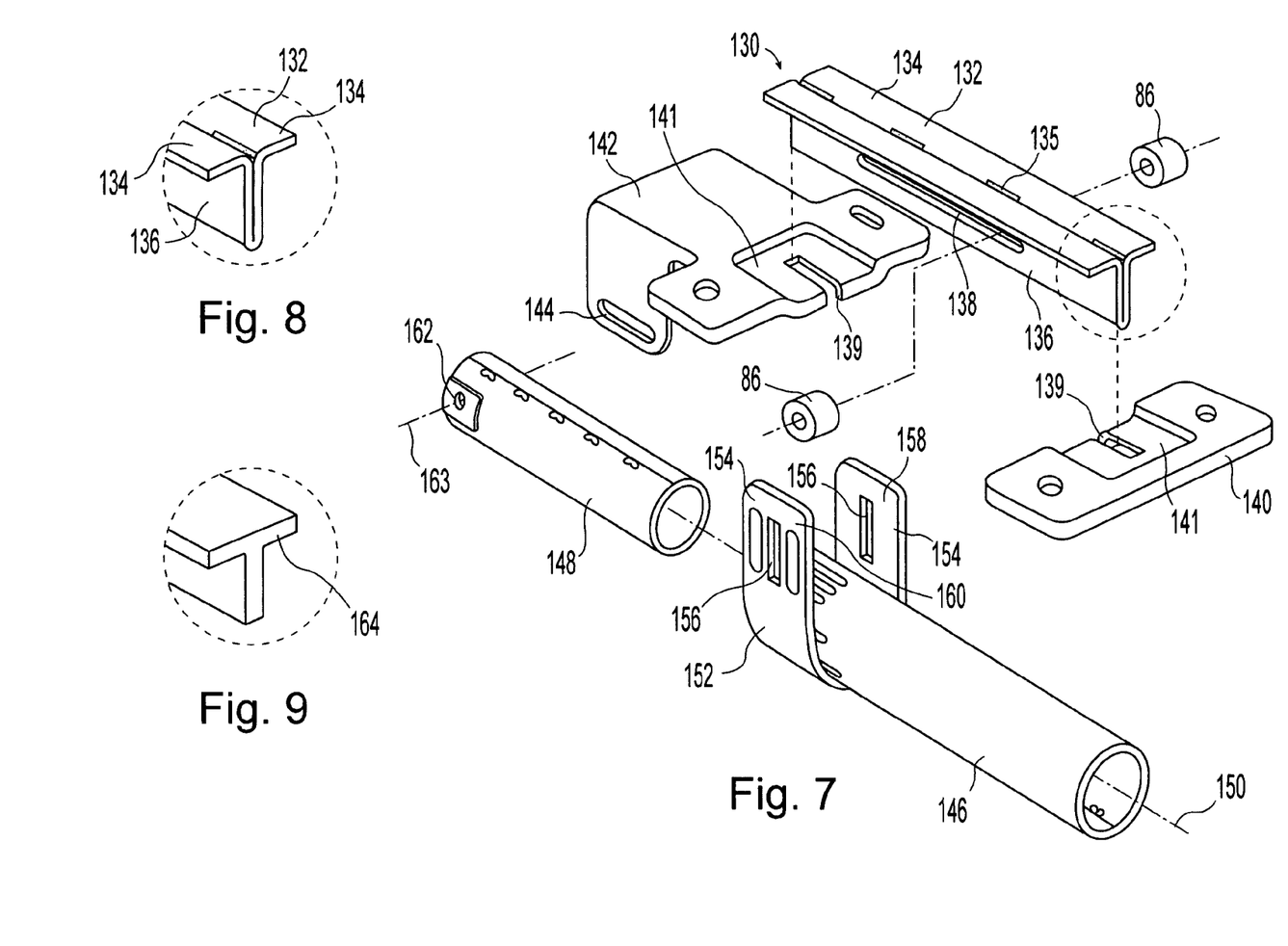
FIG. 7 is an exploded perspective view of another embodiment of the invention.
FIG. 8 is an enlarged view of a portion of FIG. 6.
FIG. 9 is an enlarged view similar to FIG. 7 of an alternative embodiment.

The present invention may also take various other forms. One example of an alternative embodiment of the invention is illustrated in FIGS. 7 and 8 and provides an assembly wherein the compression member is fixed relative to the vehicle structure with opposing sidewalls being coupled to, and moving with, a steering jacket member. Adjustable steering column assembly 130 depicted in FIGS. 7 and 8 includes a T-shaped compression member 132. Compression member 132 has an upper flange 134 and a compression rib 136 and is formed by bending metal sheet stock material. Welds 135 join the two outwardly extending portions of upper flange 134. FIG. 8 provides an enlarged view of one end of compression member 132. FIG. 9 illustrates an extruded compression member 164 having a T-shaped cross-section that can be used with assembly 130 instead of compression member 132.

An elongate slot 138 is located in compression rib 136 and spacers 86 are located on opposite sides of rib 136 to grip rib 136 in the same manner spacers 86 grip compression member 74. Although not shown in FIG. 7, assembly 130 utilizes an elongate locking member and actuating assembly similar to that described above with reference to assembly 40.

The opposite ends of compression member 132 are connected to mounting plates 140, 142 by seating rib 136 in slots 139 and upper flange member 134 in recessed areas 141 and welding member 132 to plates 140, 142. Mounting plates or brackets 140, 142 are then secured to the vehicle structure so that compression member 132 is fixed relative to the vehicle structure. Rear mounting plate 142 also includes a slot 144 for receiving a pivot pin. Upper steering jacket 146 and lower steering jacket 148 are joined together and define a jacket axis 150. A steering shaft (not shown) would extend through jacket members 146, 148 a long jacket axis 150. Jacket members 146, 148 are pivotal about tilt axis 163 defined by pivot mount 162. Pivot mount 162 is adapted to engage a pivot pin and is located on lower jacket member 148. Slot 144 allows for the repositioning of the pivot pin and tilt axis 163 relative to the vehicle structure.

A U-shaped support bracket 152 is attached to upper jacket member 146 and forms opposite sidewalls 154. Sidewalls 154 each have an elongate slot 156, inward facing surfaces 158 and outward facing surfaces 160. An elongate locking member is inserted through slots 156 of sidewalls 154, spacers 86 and compression member slot 138 in a manner similar to that described above for assembly 40. Abutment surfaces are engaged with outward facing surfaces 160 of sidewalls 154 and an actuating mechanism for biasing the abutment surfaces into a locked position similar to that discussed above with reference to assembly 40 is also provided.

Slot 138 is an axially elongate slot (with respect to axis 150) but it will generally not be positioned parallel with axis 150. Thus, the axial repositioning of upper jacket member 146 will result in both the axial repositioning of the elongate locking member within slot 138 of compression member 134 as well as the repositioning of the elongate locking member in slots 156 formed in sidewalls 154.

Figure 10:
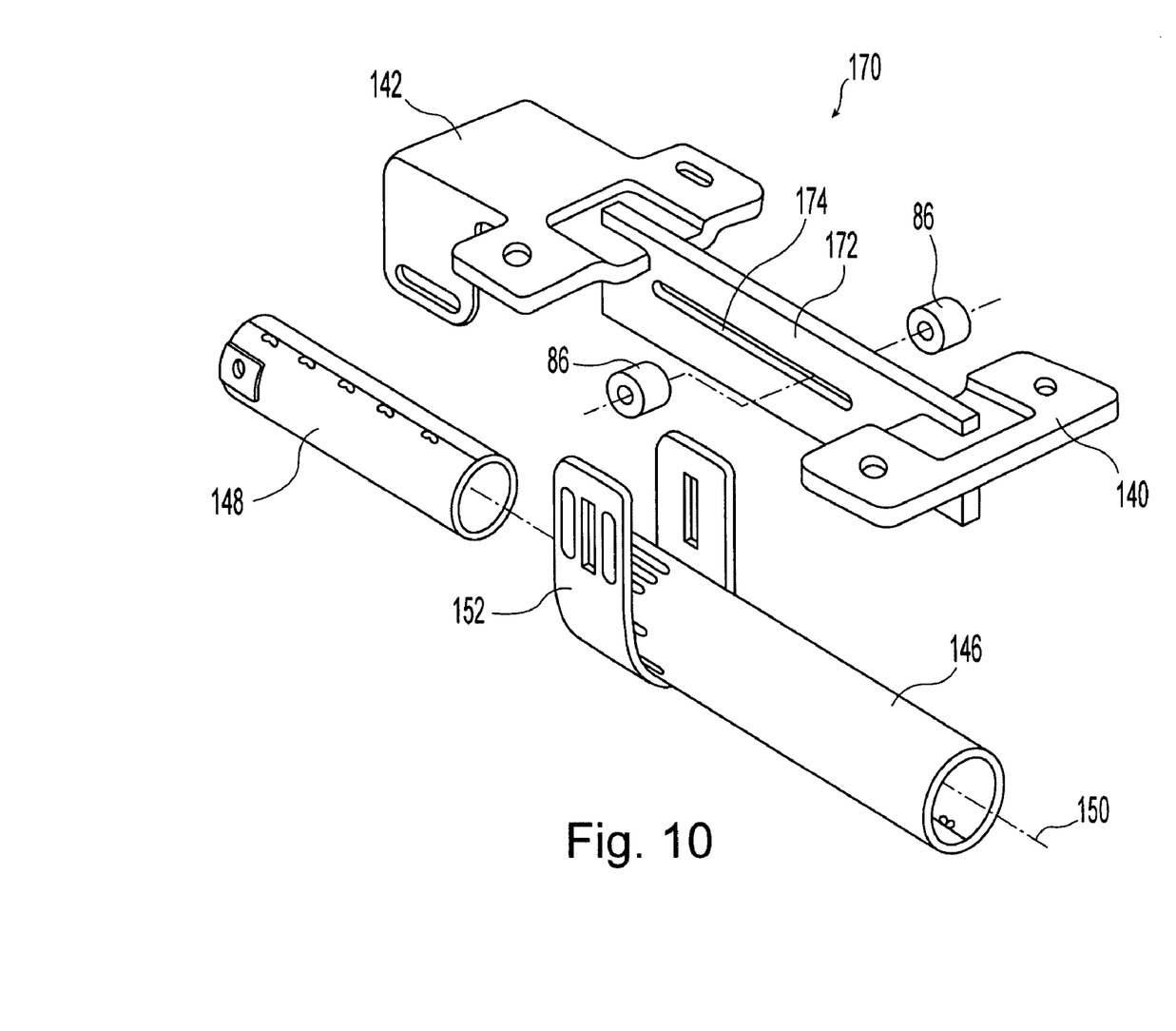
FIG. 10 is an exploded perspective view of yet another embodiment of the invention.

Another alternative embodiment 170 is depicted in FIG. 10. Assembly 170 is similar to assembly 130 but utilizes a compression member 172 having an elongate slot 174 that is formed out of bar stock and does not include an upper flange like compression members 132, 164. Like the compression members illustrated in FIGS. 8 and 9, compression member 172 would be welded or otherwise joined to mounting plates 140, 142 for securement relative to the vehicle structure.

While this invention has been described as having an exemplary design, the present invention may be further modified within the spirit and scope of this disclosure. This application is therefore intended to cover any variations, uses, or adaptations of the invention using its general principles.

What is claimed is:

1. An adjustable steering column assembly having a steering shaft and being securable to a support structure within a vehicle, said assembly comprising:

a jacket member defining a jacket axis, the steering shaft extending through said jacket member, said jacket member and the steering shaft being adjustably pivotal together about a tilt axis, pivotal movement of said jacket axis defining a central plane positioned substantially perpendicular to said tilt axis;

a compression member having an axially elongate slot extending through said compression member in a direction substantially transverse to said central plane, the compression member being a bar coupled to a portion of the jacket member and extending in a direction parallel to the jacket axis, the bar having a thickness less than a radius of the jacket member in a direction perpendicular to the jacket axis;

first and second opposing sidewalls positioned on opposite sides of said compression member wherein one of said compression member and said first and second opposing sidewalls is fixed relative to the vehicle structure and the other of said compression member and said first and second opposing sidewalls is fixed relative to said jacket member; said first and second sidewalls each have an inward facing surface and an outward facing surface and respectively define first and second passages extending between said inward and outward facing surfaces;

first and second spacers, each of said first and second spacers defining a channel extending therethrough;

an elongate locking member extending through said first and second passages, said channels defined by said first and second spacers and said axially elongate slot defined by said compression member wherein said first and second spacers are located on opposite sides of said compression member between said compression member and a respective one of said first and second opposing sidewalls;

first and second abutment surfaces, said first abutment surface engageable with said outwardly facing surface of said first sidewall, said second abutment surface engageable with said outwardly facing surface of said second sidewall, said elongate locking member being operably coupled with said first and second abutment surfaces wherein forces biasing said first and second abutment surfaces apart place said elongate locking member in tension; and an actuator assembly operably coupled with said first and second abutment surfaces, said actuator assembly being moveable between an unlocked position and a locked position wherein movement of said actuator assembly moves said steering column assembly between an unlocked position wherein said first and second abutment surfaces define a first distance therebetween, and a locked position wherein said first and second abutment surfaces define a second distance therebetween, said first distance being greater than said second distance wherein, in said locked position, said first and second abutment surfaces exert a compressive force on said first and second opposing sidewalls whereby said first and second sidewalls deflect inwardly and compressively secure said compression member between said first and second spacers and thereby inhibit relative movement of said compressive member and said first and second sidewalls and wherein, in said unlocked position, the compressive force exerted by said first and second abutment surfaces is reduced to thereby permit relative movement of said compressive member and said first and second sidewalls and wherein a combined length of said first and second spacers between said first and second abutment surfaces defines a third length.

2. The adjustable steering column assembly of claim 1 wherein said jacket member is axially repositionable, axial repositioning of said jacket member repositioning said elongate locking member within said axially elongate slot, positioning of said actuator assembly in said locked position securing said jacket member in a selected axial position, positioning of said actuator assembly in said unlocked position allowing axial repositioning of said jacket member.

3. The adjustable steering column assembly of claim 2 wherein said passages defined by said first and second sidewalls define elongate slots and said elongate locking member is repositionable within said passages as said jacket member is pivoted about said tilt axis.

4. The adjustable steering column assembly of claim 3 further comprising a substantially U-shaped support bracket engaged with said jacket member, said support bracket defining said first and second sidewalls.

5. The adjustable steering column assembly of claim 3 wherein, when said actuator assembly is in said locked position, said first and second spacers and said compression member define a substantially void-free solid material bridge through which at least some of said compressive forces transmitted between said first and second sidewalls are linearly transmittable between said first and second sidewalls.

6. The adjustable steering column assembly of claim 5 wherein said first and second spacers each comprise a metal material and respectively define first and second spacer wall thicknesses extending substantially transverse to said linearly transmittable compressive forces wherein each of said first and second spacer wall thicknesses is at least 6 mm.

7. The adjustable steering column assembly of claim 6 wherein said first and second sidewalls each comprise stamped sheet metal and respectively define first and second sidewall thicknesses extending between said inward and outward facing surfaces, said first and second sidewall thicknesses each being within a range of between approximately 3 mm and approximately 3.5 mm.

8. The adjustable steering column assembly of claim 7 wherein said compression member comprises a metal material and defines a compression member thickness between said opposite sides engageable with said first and second spacers, said compression member thickness being at least 8 mm.

9. The adjustable steering column assembly of claim 8 wherein said compression member is secured to said jacket member and said first and second sidewalls form sidewalls of a mounting bracket having a substantially U-shaped portion, said mounting bracket being adapted for securement to the vehicle structure.

10. The adjustable steering column assembly of claim 8 wherein said compression member is secured to the vehicle structure and the first and second sidewalls are fixed relative to said steering jacket member.

11. The adjustable steering column assembly of claim 10 further comprising a substantially U-shaped support bracket engaged with said jacket member, said support bracket defining said first and second sidewalls.

12. The adjustable steering column assembly of claim 3 wherein said compression member is secured to said jacket member and said elongate slot defined by said compression member is disposed within said central plane and extends substantially parallel with said jacket axis, said first and second sidewalls forming opposed sidewalls of a mounting bracket having a substantially U-shaped portion, said mounting bracket being adapted for securement to the vehicle structure.

13. The adjustable steering column of claim 1 wherein said elongate locking member is a threaded bolt.

14. The adjustable steering column of claim 1 wherein said actuator assembly includes a camming member operably coupled with a manually operable lever and said abutment surfaces wherein when said lever is located in a first position said first and second abutment surfaces are positioned at said first distance and movement of said lever from said first position into a second position repositions said camming member and said camming member thereby biasing said first and second abutment surfaces toward each other.

15. An adjustable steering column assembly having a steering shaft and being securable to a support structure within a vehicle, said assembly comprising:

a jacket member defining a jacket axis, the steering shaft extending through said jacket member, said jacket member and the steering shaft being adjustably pivotal together about a tilt axis, said tilt axis extending substantially perpendicular to said jacket axis;

a compression member being a bar that is secured to a portion of said jacket member and extending in a direction parallel to the jacket axis wherein said compression member defines a first thickness in a direction substantially transverse to said jacket axis, the first thickness being less than a radius of the jacket member in the direction substantially transverse to the jacket axis, said compression member further defining an axially elongate slot extending through said compression member in direction substantially transverse to said jacket axis;

a bracket member, said bracket member having a substantially U-shaped portion with first and second opposing sidewalls and an interconnecting portion extending between said first and second sidewalls, said bracket member being adapted for non-moveable securement to the support structure within the vehicle, said jacket member being operably coupled with said bracket member wherein said tilt axis extends substantially transversely relative to said first and second opposing sidewalls and said jacket member is selectively pivotal relative to said bracket member within said U-shaped portion of said bracket member, and wherein said first and second sidewalls each have an inward facing surface and an outward facing surface and respectively define first and second passages extending between said inward and outward facing surfaces;

first and second spacers, each of said first and second spacers defining a channel extending therethrough;

an elongate locking member extending through said first and second passages, said channels defined by said first and second spacers and said axially elongate slot defined by said compression member wherein said first and second spacers are located on opposite sides of said compression member between said compression member and a respective one of said first and second opposing sidewalls, said elongate locking member being repositioned relative to at least one of said jacket member and said bracket member as said jacket member is pivoted relative to said bracket member;

first and second abutment surfaces, said first abutment surface engageable with said outwardly facing surface of said first sidewall, said second abutment surface engageable with said outwardly facing surface of said second sidewall, said elongate locking member being operably coupled with said first and second abutment surfaces wherein forces biasing said first and second abutment surfaces apart place said elongate locking member in tension; and an actuator assembly operably coupled with said first and second abutment surfaces, said actuator assembly being moveable between an unlocked position and a locked position wherein movement of said actuator assembly moves said steering column assembly between an unlocked position wherein said first and second abutment surfaces define a first distance therebetween, and a locked position wherein said first and second abutment surfaces define a second distance therebetween, said first distance being greater than said second distance wherein, in said locked position, said first and second abutment surfaces exert a compressive force on said first and second opposing sidewalls whereby said first and second sidewalls deflect inwardly and compressively secure said compression member between said first and second spacers and thereby inhibit relative movement of said compressive member and said bracket member and wherein, in said unlocked position, the compressive force exerted by said first and second abutment surfaces is reduced to thereby permit relative movement of said compressive member and said bracket member.

16. The adjustable steering column assembly of claim 15 wherein when said actuator assembly is in said locked position and said first and second sidewalls compress said first and second spacers into compressive engagement with said compression member, said first and second spacers and said compression member define a substantially void-free solid material bridge through which at least some of said compressive forces transmitted between said first and second sidewalls are linearly transmittable between said first and second sidewalls.

17. The adjustable steering column assembly of claim 16 wherein said first and second spacers each comprise a metal material and respectively define first and second spacer wall thicknesses extending substantially transverse to said linearly transmittable compressive forces wherein each of said first and second spacer wall thicknesses is at least 6 mm;

wherein said first and second sidewalls each comprise stamped sheet metal and respectively define first and second sidewall thicknesses extending between said inward and outward facing surfaces, said first and second sidewall thicknesses each being within a range of between approximately 3 mm and approximately 3.5 mm; and wherein said compression member comprises a metal material, said compression member being welded to said jacket member and defining a compression member thickness between said opposite sides engageable with said first and second spacers, said compression member thickness being at least 8 mm.

18. The adjustable steering column assembly of claim 16 wherein said jacket member is axially repositionable, axial repositioning of said jacket member repositioning said elongate locking member within said elongate slot defined by said compression member, positioning of said actuator assembly in said locked position securing said jacket member in a selected axial position, positioning of said actuator assembly in said unlocked position allowing axial repositioning of said jacket member; and wherein said passages defined by said first and second sidewalls define elongate slots wherein said elongate locking member is repositionable within said passages as said jacket member is pivoted about said tilt axis.

19. The adjustable steering column assembly of claim 18 wherein said first and second spacers each comprise a metal material and respectively define first and second spacer wall thicknesses extending substantially transverse to said linearly transmittable compressive forces wherein each of said first and second spacer wall thicknesses is at least 6 mm;

wherein said first and second sidewalls each comprise stamped sheet metal and respectively define first and second sidewall thicknesses extending between said inward and outward facing surfaces, said first and second sidewall thicknesses each being within a range of between approximately 3 mm and approximately 3.5 mm; and wherein said compression member comprises a metal material, said compression member being welded to said jacket member and defining a compression member thickness between said opposite sides engageable with said first and second spacers, said compression member thickness being between 8 mm to 10 mm.

20. An adjustable steering column assembly having a steering shaft and being securable to a support structure within a vehicle, said assembly comprising:

a jacket member defining a jacket axis, the steering shaft extending through said jacket member, said jacket member and the steering shaft being adjustably pivotal together about a tilt axis, said tilt axis extending substantially perpendicular to said jacket axis along a central plane;

a bracket member, having a first and second opposing sidewalls and an interconnecting portion extending between said first and second sidewalls, said bracket member secured to the support structure within the vehicle, said jacket member being operably coupled with said bracket member wherein said tilt axis extends substantially transversely relative to said first and second opposing sidewalls, and wherein said first and second sidewalls each have an inward facing surface and an outward facing surface and respectively define first and second passages extending between said inward and outward facing surfaces;

a compression member is disposed along said central plane and having a first thickness in a direction substantially transverse to said jacket axis, the first thickness being less than a radius of the jacket member in the direction substantially transverse to the jacket axis, said compression member further defining an axially elongate slot extending through said compression member in direction substantially transverse to said jacket axis, the compression member being a bar coupled to a portion of the jacket member;

first and second spacers, said first spacer extending between said first sidewall and said compression member, said second spacers extending between said compression member and said second sidewall;

an elongate locking member extending through said first and second passages, channels in said spacers and said axially elongate slot in said compression member, said elongate locking member being repositioned relative to at least one of said jacket member and said bracket member as said jacket member is pivoted relative to said bracket member;

an actuator assembly operably coupled with a first and a second abutment surface, said actuator assembly being moveable between an unlocked position and a locked position and movement of said actuator assembly moves said steering column assembly between an unlocked position wherein said first and second abutment surfaces define a first distance therebetween, and a locked position wherein said first and second abutment surfaces define a second distance therebetween, said first distance being greater than said second distance wherein, in said locked position, said first and second abutment surfaces exert a compressive force on said first and second opposing sidewalls, said first and second sidewalls deflect inwardly.

21. The adjustable steering column assembly of claim 19, wherein the bar is a rectangular-shaped bar coupled to a bottom portion of the jacket member.

* * * * *